UNITED STATES PATENT OFFICE.

PETER ADAM SCHMITT, OF HAMBURG, GERMANY.

PROCESS OF PRODUCING FOOD-FATS.

1,034,036.  Specification of Letters Patent.  Patented July 30, 1912.

No Drawing.  Application filed December 16, 1911. Serial No. 666,159.

*To all whom it may concern:*

Be it known that I, PETER ADAM SCHMITT, manufacturer, a subject of the German Emperor, and resident of No. 51 Gr. Reichenstrasse, Hamburg, Germany, have invented certain new and useful Improvements in Processes of Producing Food-Fats, of which the following is a specification.

This invention relates to a process for the production of food fats according to which the fats used are emulsified with milk or water which are equivalents for the purposes of this invention. In similar processes hitherto used the fats were emulsified by means of the yolk with an addition of milk or water. The products thus obtained have the properties of butter for they are capable of being spread and they foam and become browned during heating without splashing. The yolk used however is never completely sterile. Consequently germs are introduced into the food fat together with the yolk thereby causing the fat to soon deteriorate. Now according to the present invention in the place of yolk a solution is used containing casein, mineral substances and carbohydrates. The casein which may be obtained entirely pure and sterile is dissolved in a known manner or by means of sodium benzoate. The mineral substances may be the salts of the alkali metals and more particularly the bicarbonates of potassium and sodium. Among the carbohydrates glucose or lactose is preferably employed, which are equivalents for the purposes of this invention. It has been found that by means of such a solution fats may be produced having the same properties as those hitherto produced with the aid of yolk. By the casein the fats are so intimately emulsified with water and connected therewith as to result in a spreadable product which does not splash during melting. The alkali bi-carbonates prevent the fat from setting in the pan and effect the foaming and browning of the melted fat. The browning of the casein which is eliminated during the melting is effected by the sugar which at the same time enhances the spreading capacity of the product.

The process is carried out in the following manner: 1stly. For the production of margarin from animal fats, the fats and oils are treated in a known manner with milk in a churn, to each 100 kg. being added 1 kg. of a solution which consists of about 100 gr. casein, 100 gr. sodium benzoate, 1 gr. bicarbonate of sodium, 6 gr. bi-carbonate of potassium, 300 gr. of lactose and 493 gr. of water. 2ndly. For the production of margarin from vegetable fat the fats and the oils are treated with milk in a churn after an addition has been made to the mixture for each 100 kg. of about 4 kg. of a solution containing about 50 gr. casein, 40 gr. sodium benzoate, 1 gr. bi-carbonate of sodium, 60 gr. bi-carbonate of potassium and 350 gr. glucose, dissolved in 499 gr. of water. The products obtained after churning is further treated in any known manner.

What I claim is:—

1. A process for the production of food fats consisting in emulsifying the fats and oils with milk and adding to the mixture of the fats and the milk a solution containing casein, mineral substances and carbohydrates.

2. A process for the production of food fats consisting in emulsifying the fats and oils with milk and adding to the mixture of the fats and the milk a solution containing casein, sodium benzoate as a solvent for the casein, mineral substances and carbohydrates.

3. A process for the production of food fats consisting in emulsifying the fats and oils with milk and adding to the mixture of the fats and the milk a solution containing casein, mineral substances comprising bicarbonates of sodium and potassium, and carbohydrates.

4. A process for the production of food fats consisting in emulsifying the fats and oils with milk and adding to the mixture of the fats and the milk a solution containing casein, mineral substances and carbohydrates comprising glucose.

Signed by me at Hamburg this second day of Dec. 1911.

PETER ADAM SCHMITT.

Witnesses:
 AUGUST WENK,
 ERNEST H. L. MUMMENHOFF.